United States Patent [19]

Power et al.

[11] 3,983,307

[45] Sept. 28, 1976

[54] THIN, TOUGH, STABLE LAMINATE

[75] Inventors: George Edward Power; Dudley Wulfekotter, both of Cincinnati, Ohio

[73] Assignee: Formica Corporation, Cincinnati, Ohio

[22] Filed: Sept. 29, 1975

[21] Appl. No.: 617,929

[52] U.S. Cl. ............................. 428/503; 156/278; 260/67 FP; 428/511; 428/530; 428/151; 428/537
[51] Int. Cl.² ................ B32B 21/06; B32B 27/04
[58] Field of Search .......... 428/151, 500, 511, 530, 428/503, 156, 532, 537; 260/67.6 R, 67 FP; 156/278, 60

[56] References Cited
UNITED STATES PATENTS

| | | | |
|---|---|---|---|
| 2,918,452 | 12/1959 | Kun et al. | 260/67.6 R |
| 3,220,916 | 11/1965 | Petropoulos | 428/339 |
| 3,589,974 | 6/1971 | Albrinck et al. | 428/296 |

*Primary Examiner*—Marion E. McCamish
*Assistant Examiner*—P. J. Thibodeau
*Attorney, Agent, or Firm*—Frank M. Van Riet

[57] ABSTRACT

A unitary, heat and pressure consolidated laminate comprising at least one paper sheet, a decorative sheet and a coating on said decorative sheet, said paper sheet and said decorative sheet being impregnated with an acrylic resin-melamine/formaldehyde resin composition and said coating comprising an acrylic resin-alkoxymethylated melamine composition.

13 Claims, No Drawings

THIN, TOUGH, STABLE LAMINATE

BACKGROUND OF THE INVENTION

The production of high pressure decorative laminates has expanded in recent years to the extent that millions of square feet of product are now being produced annually. These laminates are used for furniture, cabinetry, vertical surfaces and the like. Ordinarily, the laminates are produced by heat and pressure consolidating at least one kraft paper core sheet which has been impregnated with a thermosetting phenol/formaldehyde resin and a decorative sheet that is impregnated with a melamine/formaldehyde resin which does not undergo any noticeable color deterioration upon subsequent lamination. The decorative sheet is usually dyed or pigmented to a selected color or it may have printed thereon a specific design, pattern, etc., such as a geometric figure or a floral design. The printed matter may also constitute a wood grain print such that the finished laminate represents naturally occurring wood. Frequently, the decorative sheet has a fine quality paper impregnated with a color stable thermosetting resin as an overlay sheet thereupon which acts as a barrier to avert abrasion of the decorative sheet and thus preserve its printed character.

The trend in recent years has been toward extremely thin, light weight, low cost decorative laminates which are somewhat flexible, dimensionally stable and resistant to cracking and/or glue line failure. In accordance with the trend, U.S. Pat. Nos. 3,547,769 and 3,589,974 have recently set forth variations in the production of such laminates wherein overlay sheets are omitted and resin layers are substituted therefor, or different paper sheets, e.g., acrylic paper, have been employed. The properties of decorative laminates have also been varied by the incorporation of resins other than only melamine/formaldehyde or phenol/formaldehyde into the decorative and core sheets, see U.S. Pat. Nos. 3,218,225 and 3,220,916.

SUMMARY OF THE INVENTION

In the past, it was generally thought that tough laminates required the presence of a resin impregnant therein which was known to impart toughness to decorative laminates. Phenol/formaldehyde resins provided this property in the past and recently elastomer modified resinous systems such as acrylonitrile-butadiene copolymers, alone or with polyvinyl chloride etc. have been employed for this purpose, see above patents, also U.S. Pat. No. 3,798,117.

The laminates of the instant invention, however, are thin, tough and dimensionally stable even though they contain no phenolic resin components and no elastomeric copolymers. The phenolic and/or elastomeric materials have been replaced by melamine/formaldehyde-acrylic polymer admixtures which are impregnated into the core sheet or sheets and the decorative sheet in varying amounts, according to the instant invention. As a result, we have now produced thin, tough, dimensionally stable, decorative laminates which can be bonded to a self-supporting substrate such as plywood, particleboard, etc., which laminates are free of phenol/formaldehyde resins and therefore can be produced at a reduced cost. Additionally, the fact that phenol/formaldehyde resins need not be employed enables water-based impregnants to be used in many instances, thereby eliminating the need for utilizing solvents which necessitate recovery due to anti-pollution requirements. The excellent dimensional stability of the laminates of the present invention also enables them to be bonded to metal substrates without experiencing the laminate cracking and adhesive bond failure which usually accompanies laminates of this type.

DESCRIPTION OF THE INVENTION INCLUDING PREFERRED EMBODIMENTS

As mentioned briefly above, the instant invention is directed to a unitary, heat and pressure consolidated laminated article comprising, in superimposed relationship, A. at least one paper sheet impregnated with a substantially completely cured resinous composition which, in its uncured state, comprises a mixture of (a) and (b), said (a) comprising a polymer of
  1. a polymerizable acrylic monomer and
  2. an acrylic monomer, different from and copolymerizable with (1) and containing a functional carboxyl, amide or hydroxyl group,
  and said (b) comprising
  3. a thermosetting melamine/formaldehyde resin,
B. a decorative sheet, with its decorative side facing upwardly, impregnated with a substantially completely cured resinous composition which, in its uncured state, comprises a mixture of (c) and (d), said (c) comprising a polymer of
  4. a polymerizable acrylic monomer and
  5. an acrylic monomer different from and copolymerizable with (4) and containing a functional carboxy, amide or hydroxyl group
  and said (d) comprising
  6. a thermosetting melamine/formaldehyde resin and
C. a clear, thermoset, cross-linked resinous coating, directly applied to the upward face of said decorative sheet, comprising a composition which, in its thermosetting, non-cross-linked state, comprises a mixture of (e) and (f), said (e) comprising a polymer of
  7. a polymerizable acrylic monomer and
  8. an acrylic monomer, different from and copolymerizable with (7), containing a functional carboxyl, amide or hydroxyl group,
  and said (f) comprising
  9. a highly alkoxymethylated melamine.

Considering the laminate components in the order set forth above, component (A) comprises an impregnated paper sheet. The paper sheet employed constitutes kraft paper, creped kraft paper and the like and may be used in amounts ranging from 1 sheet to 9 sheets, preferably 1–3 sheets. The basis weight of the sheet or sheets generally ranges from about 90 to 120 pounds/3000ft.$^2$ ream. Resin pick-up of each sheet should range from about 30–45%, by weight, based on the dry weight of the sheet.

The resin composition used to impregnate the paper sheet of component (A), i.e., resin components (a) and (b) is well known in the art. Component (a) comprises (1) an acrylic monomer which is used in amounts ranging from about 75% to about 98%, by weight, based on the total weight of component (A), and (2) a second acrylic monomer which is present in amounts ranging from about 2% to about 25%, by weight, same basis, is copolymerizable with (1) and contains a carboxyl, amide or hydroxyl group.

Acrylic monomer (1) may comprise any monomer containing an acrylic radical and includes such monomers as the alkyl acrylates, i.e., methyl, ethyl, propyl, hexyl, octyl acrylate etc., the corresponding alkyl methacrylates, i.e., methyl methacrylate, ethyl methacrylate, butyl methacrylate, octyl methacrylate etc. The acrylonotriles such as acrylonitrile per se, methacrylonitrile. Mixtures of these acrylic monomers may be used in any ratio and up to about 15%, by weight, of the acrylic component (1) may be replaced by another copolymerizable monomer such as styrene, vinyl acetate, vinyl chloride, ethylene, etc.

Acrylic comonomer (2) may also comprise any monomer containing an acrylic radical which also contains the functional groups mentioned above. Specific examples of useful monomers include acrylic acid, methacrylic acid, ethacrylic acid, α-chloroacrylic acid, etc., acrylic amides such as acrylamide, methacrylamide, methylol acrylamide, methylol methacrylamide, etc., hydroxylated alkyl esters of acrylic acid, methacrylic acid, etc., such as β-hydroxyethyl acrylate, β-hydroxyethyl methacrylate, β-hydroxyethyl α'-chloroacrylate, γ-hydroxypropyl acrylate, δ-hydroxybutyl methacrylate and the like.

Suitable emulsion and solution polymerization techniques for the preparation of reactive copolymers of the type employed in practicing the present invention from monomers such as those listed hereinabove are so numerous and so well known in the art that only the most cursory treatment of such techniques is necessary here.

In general, where an emulsion system is used, the selected comonomers are emulsified in water, using from about 1% to about 10% by weight, based on the total weight of monomers present, of a conventional emulsifying agent. This emulsifying agent can be nonionic, e.g., an alkylphenoxy-polyethoxyethanol having alkyl groups of from about 7 to about 18 carbon atoms in length and from about 6 to about 60 oxyethylene units, such as the heptylphenoxypolyethoxyethanols, methyloctylphenoxypolyethoxyethanols, dodecylphenoxypolyethoxyethanols, and the like; a long chain fatty acid derivative of sorbitol, such as sorbitan monolaurate, monopalmitate, monostearate, tristearate, and the like; an ethylene oxide derivative of an etherified or esterified polyhydroxy compound having a hydrophobic carbon chain, such as a polyoxyethylene sorbitan monolaurate, monopalmitate, monostearate, and the like, anionic, e.g., sodium lauryl sulfonate, sodium isopropylnaphthalene sulfonate, di-2-ethylhexyl sodium sulfosuccinate, and the like, or cationic, e.g., stearamidopropyldimethyl-2-hydroxyethylammonium phosphate and the corresponding nitrate, stearyldimethylbenzylammonium chloride, and the like, as well as mixtures thereof.

The emulsified comonomers are copolymerized by means of a catalytic amount of a conventional free radical polymerization catalyst or catalyst system, e.g., an inorganic or organic peroxide such as hydrogen peroxide, t-butyl hydroperoxide, cumene hydroperoxide, and the like, an azo nitrile, such as α, α'-azobisisobutyronitrile and the like, an inorganic persulfate, such as ammonium persulfate, sodium persulfate, potassium persulfate, and the like, or a redox catalyst system, such as sodium metabisulfite-potassium persulfate and the like. The particular catalyst or catalyst system chosen can generally be used in amounts ranging from about 0.01% to about 3% by weight based on the total weight of comonomers present. The polymerization reaction can be carried out at a temperature ranging from about 0°C. to about 100°C., preferably at from about room temperature (25°C.) to about 70°C., and the emulsion will preferably be agitated during the reaction.

Solution polymerization of the selected comonomers is accomplished by dissolving them, together with a catalytic amount of a conventional free radical polymerization catalyst, e.g., one of the aforementioned organic peroxides, in a suitable inert organic solvent, such as acetone, methylethyl ketone, methyl isobutyl ketone, benzene, toluene, xylene, xylene-isobutanol mixtures, and the like, and heating the resulting solution at a temperature of from about 60°C. to about 190°C. until the desired degree of polymerization has taken place.

If the solvent in which the polymerization reaction is carried out is one which can also be used to dissolve the reactive copolymer and cross-linking agent when impregnating the acrylic fiber print sheet, the resulting copolymer solution, after the addition of the cross-linking agent, can be used directly to impregnate the print sheet. Alternatively, the copolymer can be separated from the solution in which it was prepared and then redissolved in the same or a different organic solvent when impregnating the print sheet.

The copolymers obtained by the above-described emulsion polymerization techniques can have molecular weights ranging from about 25,000 to about 1,000,000 or higher, as determined by intrinsic viscosity measurements [see Flory, "Principles of Polymer Chemistry" (Ithaca, N.Y., Cornell University Press, 1953), pages 308 to 311], while the corresponding solution copolymers will generally have molecular weights ranging from about 10,000 to about 1,000,000, as also determined by intrinsic viscosity measurements. The copolymers having molecular weights ranging from about 10,000 to about 100,000 are especially preferred for impregnating while those having molecular weights ranging from about 25,000 to about 1,000,000 are preferred.

Component (b) comprises a water-dispersible thermosetting melamine/formaldehyde resin of the type well known to those skilled in the art and prepared by reacting melamine and formaldehyde under known conditions at a melamine to formaldehyde ratio of from about 1 : 1.6 to about 1 : 2.5, respectively. Resins of this type are disclosed in U.S. Pat. No. 2,197,357, which patent is hereby incorporated herein by reference. Compositions such as those used herein to form component (A) of the instant laminated article are shown in U.S. Pat. No. 3,589,975, which is also hereby incorporated herein by reference.

The ratio of melamine in said component (b) to said polymer solids in polymer (a) should range from about 4 : 1 to about 0.5 : 1, respectively, preferably about 1:1. The resultant acrylic polymer-melamine/formaldehyde resin composition constitutes a two-phase system.

Component (B) of our novel laminates comprises a decorative sheet, its decorative surface facing upwardly on the laminate, which is impregnated with an acrylic polymer-melamine/formaldehyde resin composition similar to that used to impregnate the kraft paper sheet or sheets disclosed above. The decorative sheet is prepared from a fine quality α-cellulose paper having a basis weight of about 45–70 lbs/3000ft.$^2$ ream. As mentioned above, components (c) and (d) constitute the same basic ingredients as specified above, i.e., components (4) and (5) may be the same as components (1) and (2) or they may be different as long as they are selected from the same class of coreactive, acrylic monomers. Similarly, component (6) may be the same or different than component (3) as long as they both conform to the definition and requirements thereof. It can therefore be seen that the same acrylic polymer can be used to form the composition used to impregnate the decorative sheet as used to impregnate the kraft paper. Similarly, the same melamine/formaldehyde resin may be used for both impregnations. On the other hand, the acrylic polymer may be the same and the melamine/formaldehyde resins different or vice versa. The ratio of melamine in said component (d) to said polymer solids in polymer (c) should range from about 4:1 to about 1:1, preferably about 2:1. The solids pick-up of the decorative sheet should range from about 30% to about 35%, by weight, based on the dry paper sheet. The impregnating media also constitutes a two-phase polymer-resin system.

The third component (c) of our novel laminated article comprises a clear, cross-linked, thermoset coating which is positioned atop the decorative sheet. The coating comprises a mixture of components (e) and (f), component (e) again being an acrylic polymer. This acrylic polymer is comprises of components (7) and (8) which are selected from the same monomers as components (1) and (2) and (4) and (5), mentioned above. Again, the monomers can be the same as or different from those used to prepare the impregnating systems used to form components (A) and (B). They may be the same as polymer (a) or different; the same as polymer (c) or different or the same as both polymers (a) and (c) or different from both polymers (a) and (c). It is preferred, however, that each of polymers (a), (c) and (e), be formed of the same monomer components.

The other component of laminate component (c), i.e., component (f), comprises an alkyl ether of a polymethylolated melamine and is represented by the general formula

wherein M represents melamine, the starting material, $F_x$ represents the degree to which the melamine starting material has been methylolated, with $x$ representing a number between about 5 and 6, inclusive, and $A_y$ represents the degree to which the methylol groups of the polymethylolmelamine intermediate have been alkylated with lower alkyl groups containing from 1 to 3 carbon atoms, inclusive, i.e., methyl, ethyl and propyl groups, to provide alkoxy-methyl groups containing from 2 to 4 carbon atoms, inclusive, in the highly alkoxy-methylated melamine final product, with $y$ representing a number between 5 and 6, inclusive. Thus, the highly alkoxy-methylated melamines employed in the practice of the present invention include the hexa-alkyl ethers of hexamethylolmelamine, such as hexakis(methoxymethyl)melamine and the like, which represent the highest degree of methylolation and alkylation obtainable, the penta-alkyl ethers of hexametthylolmelamine, such as the pentamethyl ether of hexamethylolmelamine, and the like, and the penta-alkyl ethers of pentamethylolmelamine, such as the pentamethyl ether of pentamethylolmelamine and the like. Furthermore, as is evident from the general formula and the values of $x$ and $y$ given above, one can use mixtures of these highly alkoxymethylated melamines, e.g., a mixture of hexakis(methoxymethyl)melamine and the pentamethyl ether of hexamethylolmelamine, as well as mixtures containing minor amounts of alkoxymethylated melamines having a slightly lower degree of methylolation or alkylation. In such cases $x$ and $y$ represent average values for the degree of methylolation and alkylation. Hexakis(methoxymethyl)melamine or mixtures containing a major amount thereof together with minor amounts of other highly methoxymethylated melamines having slightly lower degrees of methylolation and methylation are preferred for use in practicing the present invention.

Highly alkoxymethylated melamines are prepared by methods which are so well known in the art that it is not necessary that they be set forth herein in any great detail. In general, these conventional methods involve the basic steps of reacting melamine with aqueous formaldehyde in mol ratios ranging from about 6.5 to about 20 mols or more of formaldehyde per mol of melamine to form polymethylolmelamines; removing the bulk of the water from the thus-formed polymethylolmelemines, and thereafter reacting the polymethylolmelamines, under acidic conditions, with from about 10 to about 20 mols of a lower alkanol, such as methanol, ethanol, propanol, and the like, per mol of melamine starting material. Various modifications and improvements of this basic process have been developed, such as those set forth in U.S. Pat. Nos. 2,715,619, to Suen et al. and 2,918,452 to Kun et al. The acrylic polymer-alkylated polymethylolated melamine coating system constitutes a single phase system and is applied to the surface of the impregnated decorative sheet so that the dry weight add-on is about 2.0–5.0 grams/ft.$^2$ or about 0.5–1.5 mil in thickness. The coating is dried at about 135°C. for about 2 minutes, i.e., so that the coating is dry but that neither the coating nor the impregnated resin is substantially advanced in its degree of cure. Compositions of this class are taught in U.S. Pat. No. 3,220,916, hereby incorporated herein by reference.

The kraft sheet or sheets and the decorative sheet can be impregnated by any conventional method, e.g., dip-, brush-, flow-, roller- or spray-coating, can be used in impregnating the sheet with the solution of the curable resinous composition. The desired degree of impregnation can be achieved by one or several treating passes and, as can be readily appreciated, where several passes are made, the solids content of the impregnating solution can be low, while for one-pass operations, higher solids contents will be required.

Following impregnation, the sheet will be dried at a temperature high enough so that substantially all of the inert organic solvent will be driven off and yet low enough so that the curable resinous impregnant will not be so substantially advanced in cure that it will not exhibit satisfactory flow under the relatively high pressures encountered in the subsequent laminating step, and thus will flow sufficiently to eliminate small pits, dents and other minor imperfections in the resinous layer. However, a certain amount of advancement is desirable prior to the time at which the entire laminating assembly is consolidated in laminating press, inasmuch as this insures that the curable resinous composition will not be squeezed out of the sheet in the press before being substantially completely cured. Furthermore, since cross-linking takes place fairly rapidly at temperatures above about 100°C., it is evident that any desired degree of advancement can be accomplished either during the drying step, if drying is carried out at sufficiently elevated temperatures, or by an additional heating period at temperatures substantially above room temperature, if drying is carried out at relatively lower temperatures, e.g., room temperature.

We may employ a two-step method of drying and partially advancing the curable resinous composition on the sheet. The first, or drying stage, involves drying the treated sheet at a temperature ranging from about room temperature, i.e., about 25°C., to not more than about 150°C. for from about 30 seconds at the upper temperatures in this range to several hours, e.g., 4 hours or more, at the lower end of the range, depending, of course, on the solvent employed as well as the drying temperature. Preferably, drying will be accomplished by subjecting the impregnated sheet to a temperature of from about 80°C. to about 130°C. for from about 3 minutes to about 10 minutes. The second stage, during which the curable resinous composition on the substantially dry print sheet is partially advanced in cure, will be carried out at a temperature of from about 110°C. to about 150°C. for from about 2 minutes to about 10 minutes.

As previously indicated, drying and partial advancement of the curable resinous composition used to treat the sheet can also be carried out in one step rather than in separate stages. However, care must be taken to avoid heating the impregnated sheet to the point at which the inert organic solvent being given off causes bubbling, since this can cause discontinuity, which in turn leads to poor bonding, particularly if, at the same time, the curable resinous composition is advanced to the point at which its flow under the relatively high pressures applied in the subsequent laminating step will be substantially diminished. Thus, one step drying (coupled with partial advancement) will preferably be carried out at a temperature ranging from about 80°C. to about 150°C. for from about 5 minutes to about 20 minutes. Coating and drying of the component (c) sheet after impregnation and drying thereof can be carried out in substantially the same manner. Impregnation of the decorative sheet is preferably effected first, however it may be useful to first coat the decorative sheet, dry it and then impregnate it with the impregnating composition in some instances.

The resultant sheets, i.e., the impregnated kraft sheet or sheets and the impregnated, coated decorative sheet are then assembled, in superimposed relationship, with the kraft sheets constituting the bottommost layer and the decorative sheet with its coated side on top and its decorative pattern revealed therethrough. The resultant assembly is then heat and pressure consolidated in conjunction with many more of said assemblies in a manner known in the art to produce the desired laminates.

The laminates of the instant invention can be used as such or, as is more commonly practiced, they may be bonded to a standard base material such as a self-supporting substrate made of particleboard, hardboard, woodwaste, plywood etc. with conventional contact adhesives.

When bonding the instant laminates to such substrates it may first be necessary to sand the back of the laminate in a manner now practiced commercially so as to render the back surface of the laminate more susceptible to adhesive bonding. However, if the laminates are very thin, i.e., are composed of two or three sheets, it is preferred that the backmost ply be first coated with a flocking adhesive. The flocking adhesive, such as a substantially fully hydrolyzed polyvinyl alcohol, while still wet, is then sprinkled with short flocked fibers of, e.g., rayon, cellulose etc. The entire assembly is then vibrated so as to orient the flock perpendicular to the plane of the laminate. Excess flock is removed by vacuum. Flock of 125 to 1450 $\mu$ in length is useful and those fibers which are hydrophilic are preferred. This ply is bonded to the back of the laminate during the laminate pressing operation.

The following examples are set forth for purposes of illustration only and are not to be construed as limitations on the present invention except as set forth in the appended claims. All parts and percentages are by weight unless otherwise specified.

EXAMPLE 1

A resin solution is prepared by admixing, with agitation, 12.0 parts of isopropanol, 55.0 parts of water and 33.0 parts of a melamine/formaldehyde resin having a ratio of melamine to formaldehyde of about 1 : 2. This solution is designated as Solution A.

A mixture is prepared from 50.0 parts of a commercial available emulsified terpolymer of acrylonitrile, ethyl acrylate and acrylic acid (70/30/10) and 50.0 parts of water. The resultant emulsion is designated as Emulsion B.

To 150.0 parts of Solution A in a suitable mixing vessel, are added 100.0 parts of Emulsion B with agitation. The result is an overall composition of 40% solids and a melamine-acrylic polymer ratio (as solids) of 1 : 1. The mixture is used to impregnate a 115 lb/3000 ft.$^2$ wet strength kraft paper using a conventional Egan paper treating machine equipped with metering rolls. The gap of the metering rolls, the temperature and the air flow in the drying ovens are adjusted until the treated paper has a 37% solids pick-up with a 7% volatile content.

In a similar manner, a 65 lb./3000 ft.$^2$ pigmented, α-cellulose printed decorative sheet is impregnated with a blend of 90.0 parts of Emulsion B and 318.0 parts of Solution A. After impregnation and drying, the resin solids content of the sheet is 30–35% and the volatile content is 3–6%.

The impregnated decorative sheet is then remounted on a similar coating/impregnating machine and by means of a reverse roll coater, is coated with Emulsion B containing 20%, based on the solids weight, of hexakismethoxymethyl melamine and 0.5% of p-toluene sulfonic acid. The coating is applied to the printed side of the decorative sheet to the extent that 3.5 grams/ft.$^2$ or about a 1.1 mil thick coating, are added. The resultant decorative sheet is dried for 2 minutes at 135°C. Neither the coating nor the impregnated resin composition is substantially advanced in its degree of cure.

A series of laminate assemblies are then collated as follows, starting from the bottom of the assembly:
 one ply of a glassine separator sheet
 one ply of the impregnated kraft paper
 one ply of the impregnated decorative sheet, face up
 one ply of 1 mil polypropylene film
 one ply of the impregnated decorative sheet, face down
 one ply of the impregnated kraft paper
 one ply of a glassine separator sheet The assembly is then repeated in this relationship until a total of forty individual laminate assemblies are completed. The assemblies are then placed between two ¼ inch cold rolled steel plates and inserted in a conventional hydraulic press and heated to about 142°C. and 1400 p.s.i. for about 15 minutes. The pressure in the press is relieved at 100°C. and again at 130°C. to allow the escape of the methanol given off during the cross-linking reaction of the hexakismethoxymethyl melamine. The pressure is then restored to 1400 p.s.i. and the cure is continued.

After cooling, the resultant laminates are separated are trimmed. When subjected to NEMA standard test methods, the following properties are noted, see Table I, below.

TABLE I

Properties of Laminate of Example 1

| Property | NEMA Test Method | Value |
|---|---|---|
| Resistance of Surface to Wear | LD 1-2.01 | |
| Cycles | | 115 |
| Wear Rate | | .130 |
| Resistance of Surface to Boiling Water | LD 1-2.02 | No Effect |
| Resistance of Surface to High Temperature | LD 1-2.03 | No Effect |
| Resistance of Surface to Cigarette Burns | LD 1-2.04 | 65 secs. |
| Resistance of Surface to Stains | LD 1-2.05 | No effect* |
| Color Fastness of Surface to Light | LD 1-2.06 | No effect |
| Dimensional Change | LD 1-2.08 | |
| Length | | .17% |
| Width | | .45% |
| Resistance to Impact | | 18-24 in. |
| Resistance to Stress Cracking | | 81 hrs.** |
| Cold Formability - Minimum Radius | | *** |
| Length | | .325 in. |
| Width | | .250 in. |

*All but iodine (superficial)
**Conventional laminates fail in 3 hrs.
***1¼"×5" samples bent around known radii until minimum radius laminate will not crack or craze is determined.

EXAMPLE 2

When the procedure of Example 1 is again followed except that the decorative sheet coating is increased to 7.0 grams/ft.², the resulting laminates are 0.015 inch thick and show an abrasion resistance of 248 cycles.

EXAMPLE 3

An abrasion resistance of 294 cycles is observed when the procedure of Example 1 is again followed but the decorative sheet coating is increased to 9.0 grams/ft.² The laminate thickness is 0.016 inch.

EXAMPLE 4

The procedure of Example 1 is again followed except that three sheets of impregnated kraft paper are used. The resultant laminates are reduced to a 0.015 inch thickness on a drum sander and are then bonded to a ¾ inch particleboard sheet of 8 × 4 foot dimensions using a water-borne urea/formaldehyde bonding adhesive. An excellent laminate composite is recovered.

EXAMPLE 5

Example 1 is again repeated except that the dry, impregnated kraft sheets are first coated with a substantially fully hydrolyzed polyvinyl alcohol adhesive. While still wet, the adhesive layers are sprinkled with random cut cellulose flock fiber (a pulverized, bleached sulfite softwood pulp with a mesh size of 200) 10-15 mols in length. Vibration orients the flock perpendicularly to the plane of the laminate. The excess flock is removed by vacuum and the sheets are dried to a 3% volatile content. The sheets are then used to produce laminates as in Example 1 with the flocked side thereof adjacent the glassine sheets. The resultant laminates are then coated on their backmost sides with a contact adhesive. When bonded to a metal substrate, an excellent laminated structure is produced.

EXAMPLES 6-11

The procedure of Example 1 is again followed except that the acrylic polymer used to form Emulsion B is varied as follows:

| | |
|---|---|
| Example 6 - MMA/EA/AA | (60/35/5) |
| Example 7 - BMA/MAA | (85/15) |
| Example 8 - AN/BA/HEA | (50/45/5) |
| Example 9 - MA/HPA | (88/12) |
| Example 10 - BA/EMA/AM | (50/25/25) |
| Example 11 - MAN/BA/AA | (90/5/5) No. 1 |
| EMA/S/MAA | (90/2/8) No. 2 |

In Example 6, only the acrylic polymer used to produce the emulsion used as the decorative sheet coating is changed. In Example 10, only the acrylic polymer used to produce the emulsion used to impregnate the kraft sheet is changed. In Example 11, polymer No. 1 is used to produce the the emulsion used to impregnate the decorative sheet and polymer No. 2 is used to produce the emulsion used to impregnate the kraft paper sheet.

In each instance, laminates having properties similar to those set forth in Table I are produced. In Examples 6-11 above, MMA = methyl methacrylate; EA=ethyl acrylate; AA = acrylic acid; BMA = n-butyl methacrylate. MAA = methacrylic acid; AN = acrylonitrile; BA = n-butyl acrylate; HEA = β-hydroxyethylacrylate; MA = methyl acrylate; HPA = γ-hydroxypropyl acrylate; EMA = ethyl methacrylate; AM = acrylamide; MAN = methacrylonitrile; S = styrene.

We claim:
1. A unitary heat and pressure consolidated laminated article comprising, in superinposed relationship,
   A. at least one paper sheet impregnated witn a substantially completely cured resinous composition, which, in its uncured state, comprises a mixture of (a) and (b), said (a) comprising a polymer of
      1. from about 75% to about 98%, by weight, based on the total weight of polymer (a), of a polymerizable acrylic monomer and
      2. from about 2% to about 25%, by weight, based on the total weight of polymer (a), of an acrylic monomer which is different from and copolymerizable with (1) and contains a functional group comprising carboxyl, amide or hydroxyl groups, and said (b) comprising
      3. a thermosetting melamine/formaldehyde resin having a ratio of melamine to formaldehyde ranging from about 1 : 1.6 to about 1 : 2.5, respectively,
   the ratio of melamine in said (b) to polymer (a) ranging from about 4 : 1 to about 0.5 : 1, respectively,

B. a decorative sheet, with its decorative side facing upwardly, impregnated with a substantially completely cured resinous composition which, in its uncured state, comprises a mixture of (c) and (d), said (c) comprising a polymer of
   4. from about 75% to about 98%, by weight, based on the total weight of polymer (c), of a polymerizable acrylic monomer and
   5. from about 2% to about 25%, by weight, based on the total weight of polymer (c), of a acrylic monomer which is different from and copolymerizable with (4) and contains a functional group comprising carboxyl, amide or hydroxyl groups, and said (d) comprising
   6. a thermosetting melamine/formaldehyde resin having a ratio of melamine to formaldehyde ranging from about 1 : 1.6 to about 1 : 2.5, respectively,
   the ratio of melamine in said (d) to polymer (c) ranging from about 4 : 1 to about 1 : 1, respectively, and
C. a clear, thermoset cross-linked resinous coating, directly applied to the upward face of said decorative sheet, comprising a composition, which, in its thermosetting, non-cross-linked state, comprises a mixture of (e) and (f), said (e) comprising a polymer of,
   7. from about 75% to about 98%, by weight, based on the total weight of polymer (e), of a polymerizable acrylic monomer and
   8. from about 2% to about 25%, by weight, based on the total weight of polymer (e), of an acrylic monomer which is different from and copolymerizable with (7) and contains a functional group comprising carboxyl, amide or hydroxyl groups, and said (f) comprising
      9. from about 10% to about 100%, by weight, based on the total weight of said (8), of a highly alkoxymethylated melamine.

2. A laminated article according to claim 1 wherein (a) is a polymer acrylonitrile, ethyl acrylate and acrylic acid.

3. A laminated article according to claim 1 wherein (a) is a polymer of acrylonitrile, ethyl acrylate and 2-hydroxyethyl acrylate.

4. A laminated article according to claim 1 wherein (c) is a polymer of acrylonitrile, ethyl acrylate and acrylic acid.

5. A laminated article according to claim 1 wherein (c) is a polymer of acrylonitrile, ethyl acrylate and 2-hydroxyethyl acrylate.

6. A laminated article according to claim 1 wherein (e) is a polymer of acrylonitrile, ethyl acrylate and acrylic acid.

7. A laminated article according to claim 1 wherein (e) is a polymer of acrylonitrile, ethyl acrylate and 2-hydroxyethyl acrylate.

8. A laminated article according to claim 1 wherein (9) is hexakismethoxymethyl melamine.

9. A laminated article according to claim 1 wherein (a), (c), and (e) are polymers of acrylonitrile, ethyl acrylate and acrylic acid.

10. A laminated article according to claim 1 wherein (a), (c) and (e) are polymers of acrylonitrile, ethyl acrylate and 2-hydroxyethyl acrylate.

11. A laminated article according to claim 9 wherein (9) is hexakismethoxymethyl melamine.

12. A laminated article according to claim 10 wherein (9) is hexakismethoxymethyl melamine.

13. A method for the production of the article of claim 1 which comprises heat and pressure consolidating a laminate assembly, consisting essentially of, in superimposed relationship,
A. at least one paper sheet impregnated with a substantially completely curable resinous composition which comprises a mixture of (a) and (b), said (a) comprising a polymer of
   1. from about 75% to about 98%, by weight, based on the total weight of polymer (a), of a polymerizable acrylic monomer and
   2. from about 2% to about 25%, by weight, based on the total weight of polymer (a), of an acrylic monomer which is different from and copolymerizable with (1) and contains a functional group comprising carboxyl, amide or hydroxyl groups, and said (b) comprising
   3. a thermosetting melamine/formaldehyde resin having a ratio of melamine to formaldehyde ranging from about 1 : 1.6 to about 1 : 2.5, respectively,
   the ratio of melamine in said (b) to polymer (a) ranging from about 4:1 to about 0.5:1, respectively,
B. a decorative sheet, with its decorative side facing upwardly, impregnated with a substantially completely curable resinous composition which comprises a mixture of (c) and (d), said (c) comprising a polymer of
   4. from about 75% to about 98%, by weight, based on the total weight of polymer (c), of a polymerizable acrylic monomer and
   5. from about 2% to about 25%, by weight, based on the total weight of polymer (c) of an acrylic monomer which is different from and copolymerizable with (4) and contains a functional group comprising carboxyl, amide or hydroxyl groups, and said (d) comprising
   6. a thermosetting melamine/formaldehyde resin having a ratio of melamine to formaldehyde ranging from about 1 : 1.6 to about 1 : 2.5, respectively,
   the ratio of melamine in said (d) to polymer (c) ranging from about 4 : 1 to about 1 : 1, respectively, said decorator sheet having
C. a clear, thermosetting, cross-linkable resinous coating, directly applied to the upward face thereof, said coating comprising a composition which comprises a mixture of (e) and (f), said (e) comprising a polymer of,
   7. from about 75% to about 98%, by weight, based on the total weight of polymer (e), of a polymerizable acrylic monomer and
   8. from about 2% to about 25%, by weight, based on the total weight of polymer (e), of an acrylic monomer which is different from and copolymerizable with (7) and contains a functional group comprising carboxyl, amide or hydroxyl groups, and said (f) comprising
      9. from about 10% to about 100%, by weight, based on the total weight of said (8), of a highly alkoxymethylated melamine.

* * * * *